(12) United States Patent
Hsu

(10) Patent No.: US 7,958,818 B2
(45) Date of Patent: Jun. 14, 2011

(54) METHOD AND APPARATUS FOR CONTINUOUS CURDING

(76) Inventor: Eric Hsu, Archerfield (AU)

( * ) Notice: Subject to any disclaimer, the term of this patent is extended or adjusted under 35 U.S.C. 154(b) by 1545 days.

(21) Appl. No.: 10/543,272

(22) PCT Filed: Jan. 22, 2004

(86) PCT No.: PCT/AU2004/000076
§ 371 (c)(1), (2), (4) Date: Jul. 25, 2005

(87) PCT Pub. No.: WO2004/071206
PCT Pub. Date: Aug. 26, 2004

(65) Prior Publication Data
US 2006/0133191 A1  Jun. 22, 2006

(30) Foreign Application Priority Data

Feb. 12, 2003  (AU) ................................ 2003900614

(51) Int. Cl.
*A23L 1/20* (2006.01)
*A23J 3/16* (2006.01)

(52) U.S. Cl. ............................. 99/452; 99/483; 426/634

(58) Field of Classification Search ............ 99/352–355, 99/452–460, 348, 327–333, 483, 484, 510–513, 99/485–489, 467–472; 426/451, 468, 392, 426/393, 634, 518, 486, 507, 656
See application file for complete search history.

(56) References Cited

U.S. PATENT DOCUMENTS

| 4,771,681 A * | 9/1988 | Nagata ............................ 99/453 |
| 4,996,916 A * | 3/1991 | Miyawaki et al. .............. 99/453 |
| 5,363,753 A * | 11/1994 | Ueda et al. ....................... 99/453 |
| 5,701,810 A * | 12/1997 | Nakai ............................... 99/495 |
| 5,950,525 A * | 9/1999 | Iwamoto .......................... 99/452 |
| 6,074,686 A | 6/2000 | Iwamoto |
| 6,143,351 A | 11/2000 | Gupta |
| 6,235,337 B1 * | 5/2001 | Imamura et al. .............. 426/634 |
| 6,331,324 B1 * | 12/2001 | Tomita et al. ................. 426/634 |
| 6,688,214 B1 * | 2/2004 | Kikuchi et al. ................. 99/483 |
| 7,017,475 B2 * | 3/2006 | Moriyama et al. .............. 99/330 |
| 2003/0175394 A1 * | 9/2003 | Modler ........................ 426/522 |

FOREIGN PATENT DOCUMENTS

| JP | 2-60561 A * | 3/1990 |
| JP | 02-227039 A * | 9/1990 |
| JP | 2-227039 A * | 9/1990 |
| JP | 02-227040 A * | 9/1990 |
| JP | 2-227040 A * | 9/1990 |
| JP | 2001314165 | 11/2001 |
| JP | 2002-142703 A * | 5/2002 |
| JP | 2002-223716 A * | 8/2002 |
| JP | 2002-238486 A * | 8/2002 |
| JP | 2003124319 | 4/2003 |

\* cited by examiner

*Primary Examiner* — Geoffrey S Evans
(74) *Attorney, Agent, or Firm* — Alston and Bird LLP

(57) ABSTRACT

A soy curding apparatus for continuously producing soy curd from soy milk including a pump for pumping soy milk and soy curd; a coagulator dispensing apparatus positioned for adding a coagulant; an expansion chamber to produce a pre soy curd mixture; a maturing apparatus to allow further mixing and maturing of the soy curd; a whey separating apparatus for separating the whey from the curd; a tower to remove residual whey to form a plug of soy curd of a desired consistency and moisture content and to cut a block from the soy plug; a conveyor apparatus adapted to receive and transport the block from the tower.

15 Claims, 1 Drawing Sheet

METHOD AND APPARATUS FOR CONTINUOUS CURDING

BACKGROUND OF THE INVENTION

1. Field of the Invention

This invention relates to a continuous curding method, typically for the continuous production of soy curd products. This invention also relates to an apparatus for continuously making curd.

2. Background Art

In China the making of soy curd products has traditionally been made by the same process for thousands of years.

Simply stated, soy curd products, such as tofu, are made by hand in such a way that soy milk made from soybeans that are ground and the fibre and milk separated. The soy milk is boiled and then coagulating agent is added and mixed to form the soy curd. Then the soy curd is put into a mold lined with cheesecloth and is pressed to remove whey. Then the pressed soy curd is removed from the mold and unwrapped from the cheesecloth. After which the soy curd is cut into desired sized blocks. This process is traditionally done by hand and as such is very labor intensive and time consuming and the finished product is not always guaranteed of a good and/or suitable quality batch. Over time parts of this process have been refined by introducing apparatus in attempt to speed up the soy making process such as mechanical stirrers or mechanical presses. However these apparatus still result batch processing of soy curd and they still involve steps that are preformed manually.

There is a need to maintain a desired consistency and particulate size of soy curd and a need to apply the desired amount of coagulant to react with the soy milk so that clumping does not occur and the consistency of the soy curd block thus formed is uniform and to the desired results.

SUMMARY

It is an object of the invention to provide an improved soy curd apparatus and method of producing soy curd products that ameliorate some of the disadvantage and limitations of the known art or at least provide the public with a useful choice.

In one aspect the invention resides in an soy curd apparatus for continuously producing soy curd from soy milk wherein the apparatus includes:

a pump for continuously pumping soy milk and formed soy curd through the apparatus;

a coagulator dispensing means positioned downstream of said pump for adding a coagulant to the soy milk;

an expansion chamber positioned downstream of the coagulator dispensing means to allow the coagulant to mix with the soy milk to produce a pre-soy curd mixture;

a maturing means positioned downstream of the expansion chamber to allow further mixing of the pre-soy curd mixture and maturing of the pre soy curd mixture matures to form soy curd of a desired consistency and particular size;

a whey separating means positioned downstream of the maturing means for separating the whey from the curd;

a tower positioned downstream of the whey separating means to receive the formed curd, said tower adapted to remove residual whey from the soy curd to form a plug of soy curd in the tower of a desired consistency and moisture content and is adapted to cut the soy curd plug to form a block of soy curd at the downstream end of the tower;

a conveyor means positioned at the downstream end, wherein said conveyor means is adapted to receive the block of soy curd as the soy curd block exits the tower and then transport a severed soy curd block from the tower.

Preferably the pump is a positive displacement pump adapted to provide constant flow of soymilk and formed soy curd through the soy curd making apparatus.

Preferably the coagulator dispensing means is adapted to add coagulant at a constant flow rate to enable the desired consistency of soy curd to be produced.

Preferably the maturing means is a tube of predetermined length and configuration, wherein the length and configuration of the tube is adapted to enhance further mixing and maturing of the pre soy curd mixture and to prevent the pre soy curd mixture from sticking to the internal walls of the tube.

Preferably the tube has a helical or serpentine or s-type or sinusoidal configuration adapted to enable the soy curd to travel in a convoluted or meandering path through the tube to enhance further mixing and maturing of the pre soy curd mixture and to prevent the pre soy curd mixture from sticking to the internal walls of the tube.

Preferably the whey separating means has a chamber enclosing a perforated tube and a drain for removing whey, wherein the upstream end of the perforated tube is connected to the downstream end of the maturing means and the downstream end of the perforated tube is connected to the upstream end of the tower, and further wherein the perforated tube is adapted to express whey through the perforations of the perforated tube into the chamber and out through the drain as the soy curd moves through the perforated tube.

Preferably the whey separating means has a cutter means positioned at the upstream end of the perforated tube, wherein the cutter means is adapted to cut the soy curd as the soy curd enters the perforated tube to assist in the separating of whey.

Preferably the tower includes:

a perforated column adapted to receive soy curd from the whey separating means and adapted express residual whey through the perforations of the perforated column;

a residual whey collector adapted to collect and drain residual whey;

closure means positioned at the downstream end of the tower adapted to open and close at predetermined intervals, wherein in the open position a soy curd is able to exit the tower.

Preferably the tower is adapted to allow the soy curd to be compressed under it's own weight, typically due to gravitational forces, to enable residual whey to be expressed through the perforations in the perforated column.

Preferably the soy curd exits the tower, when the closure means is in an open position, typically under the influence of gravity.

Preferably the closure means includes a cutting blade adapted to cut the soy curd as the closure means moves from an open position to a closed position to enable a block of soy curd of predetermined height to be produced.

Preferably the conveyor means is adapted to transport a soy block in a horizontal direction away from the tower and wherein the conveyor means is adapted to move vertically towards and away from the closure means to assist in removing and forming soy curd block of a predetermined size as the soy curd exits the tower.

Preferably the conveyor means is adapted to be positioned in a uppermost position, as the closure means opens, immediately below the exit of the tower such that the soy curd exiting the tower falls on to the conveyor means and the conveyor means is also adapted to be positioned in a lowermost position as the closure means closes, wherein the distance between the uppermost and lowermost positions can be varied to allow for a soy curd blocks of different sizes to be formed.

Preferably the conveyor means has cutter means positioned downstream from the tower adapted to cut the soy curd blocks into smaller blocks and/or shapes.

In a second aspect the invention resides in a method of producing soy curd according the apparatus of the first aspect hereinbefore described, where the method includes the steps of:

continuously pumping soy milk through the pump to force the soy milk and the formed soy curd through the soy curd apparatus;

adding a coagulant to the soy milk via the coagulator dispensing means downstream of said pump;

allowing the soy milk coagulant mixture to mix in the expansion chamber positioned downstream of the coagulator dispensing means to from a pre-soy curd mixture;

moving the pre soy mixture through the maturing means positioned downstream of the expansion chamber to further mix the pre-soy curd mixture to allow the pre soy mixture to mature to form soy curd of a desired consistency and particular size;

passing the soy curd through the whey separating means positioned downstream of the maturing means to separate the whey from the soy curd;

allowing the soy curd to enter the tower positioned downstream of the whey separating means wherein in the tower the soy curd is further compressed, typically under the soy curds own weight, and residual whey is removed from the soy curd, thus forming a plug of soy curd in the tower of a desired consistency and moisture content.

allowing the soy curd to fall, typically under gravity, onto a conveyor means positioned at the downstream end of the tower, wherein said conveyor means receives the soy curd plus as the soy curd plus exits the tower and then the plug of soy curd is severed to form a block of soy curd which is then transported away from the tower by the conveyer means.

Other aspects of the invention are herein described.

DESCRIPTION OF INVENTION

Figure 1:
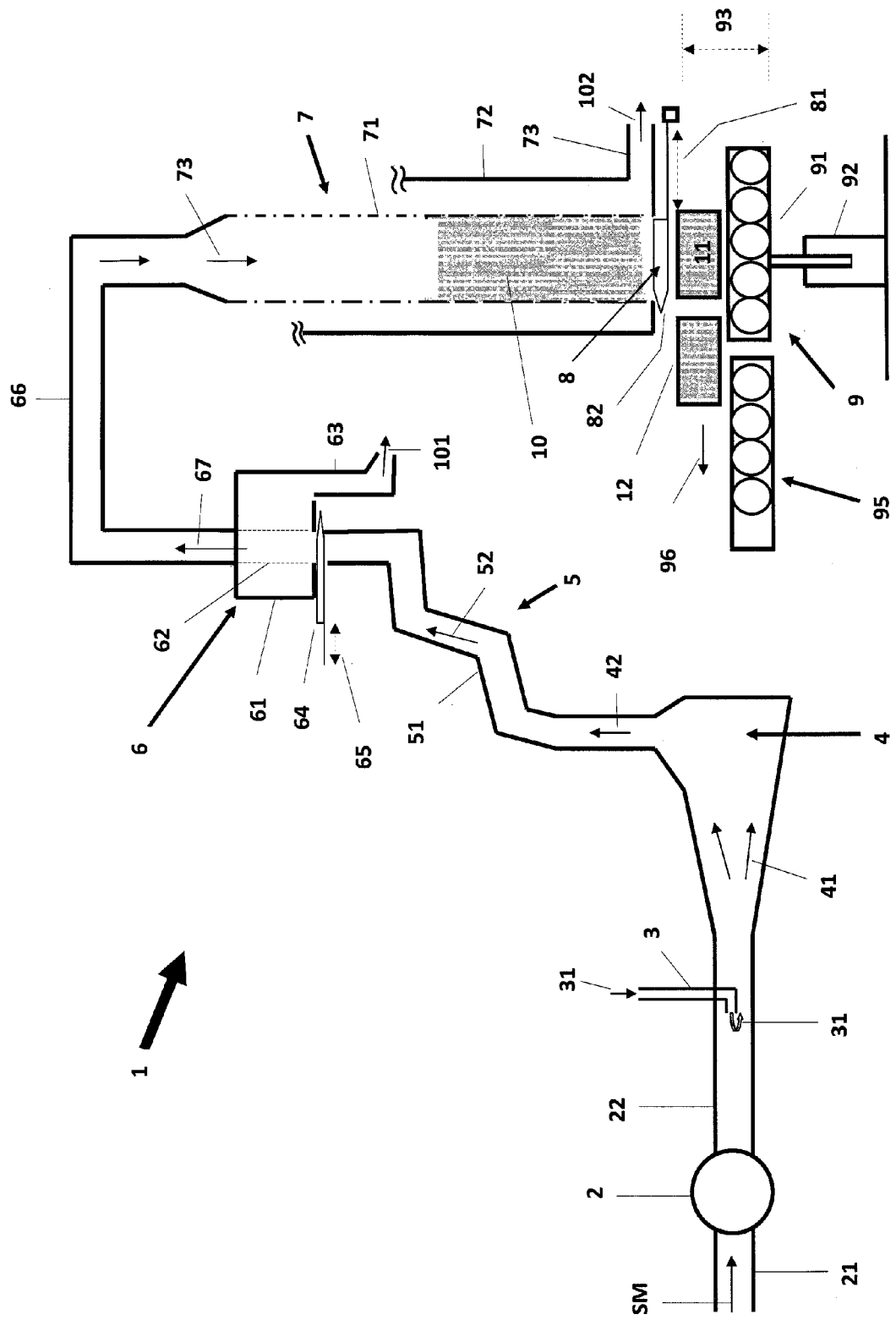
FIG. 1 is a plan view of a soy curd apparatus in accordance to an embodiment of the invention.

The FIGURE shows a soy curd apparatus 1 in accordance to the invention. The soy curd apparatus 1 continuously produces soy curd 10 from soymilk SM. The soy curd apparatus has a pump 2, typically a positive displacement pump that pumps soymilk SM and soy curd through the soy curd apparatus. Downstream from the pump 2 a coagulant 31 is added to the soymilk SM via a coagulant dispenser 3 after which the soymilk coagulant mixture 41 enters an expansion chamber 4 to allow the soymilk coagulant mixture 41 to mix together to form a pre-soy curd mixture 42.

The pre-soy curd mixture 42 is then forced, due to the action of the pump 1, through a maturing means 5 positioned downstream of the expansion chamber 4 to allow further mixing of the pre-soy curd mixture and wherein the pre-soy curd mixture matures to form soy curd 52 of a desired consistency and particular size. Typically the maturing means 5 is a tube 51 having a predetermined length and configuration that enhances the further mixing and maturing of the soy curd 52 and prevents the pre soy curd 52 sticking to the internal walls of the tube 51 as the soy curd moves through the tube 51. Typically the tube 51 has a helical or serpentine or s-type or sinusoidal configuration to enable the soy curd 52 to travel in a convoluted or meandering path through the tube 51.

Downstream from the maturing means 4 is a whey separator 6 for separating whey 101 from the soy curd 52. The whey separator 6 typically consists of a chamber 61 enclosing a perforated tube 62 and a drain 63 for removing whey 101. The upstream end of the perforated tube 62 is connected to the downstream end of the maturing means 4 and the downstream end of the perforated tube 62 is connected to the upstream end of the tower 7, Whey is expressed through the perforations of the perforated tube 62 into the chamber 61 and out through the drain 63 as the soy curd 67 moves through the perforated tube 62. To assist in the separation of the whey from the soy curd a cutter means, typically a knife 64 is positioned at the upstream end of the perforated tube 62. The knife 64, preferably in a reciprocal movement 65, is adapted to cut the soy curd as the soy curd enters the perforated tube 62, thus releasing the whey from the soy curd.

After leaving the whey separator 6 the soy curd 67,73 enters a tower 7. The tower 7 includes a perforated column 71, a residual whey collector 72 and a closure means 8. Soy curd 10 within the tower 7 is compressed under its own weight, typically due to gravitational forces, and as such residual whey is expressed from the soy curd 10 through the perforations in the perforated column 71. The residual whey collector 72 collects whey 102 expressed from the soy curd through perorations in the perorated column 71 and drains the residual whey through a drain 73. The closure means 8 is positioned across the exit at the downstream end of the tower. The closure means 8 is adapted to open and close predetermined intervals corresponding to a desired length of time required for the soy curd to form a plug 10 of soy curd having the desired consistency and moisture content. The closure means 8 has a cutting blade 82 adapted to cut the plug soy curd 10 as the closure means moves (81) from an open position to a closed position to produce a block of soy curd 11. The soy curd plug 10 exits the tower 7, typically under the influence of gravity, when the closure means 8 is in an open position.

A conveyor 9 is positioned at exit of the tower to receive the block of soy curd 11 as the soy curd plug 10 exits the tower 7 and then transports the soy curd blocks 11, 12 away in a horizontal direction (96) from the tower 7 to another conveyor 95. The conveyor 9 is able to move vertically towards and away from the exit of the tower 7. When in the uppermost position the conveyor 9 is immediately below the tower exit to receive the plug 10 of soy curd as it exits the tower 7 when the closure means 8 is in an open position. The conveyor 9 is lowered toward a lowermost position a distance 93 that equates to a desired soy curd block height. After which the closure means 8 closes and servers the soy curd with the cutting blade 82 to from the of soy curd 11. The conveyor 9 can be raised by any suitable raising and lowering means 92 such as a pneumatic or hydraulic ram. Typically the conveyor 9, 95 has further cutter means 105 positioned downstream from the tower 7 to cut the soy curd blocks 11, 12 into smaller blocks and/or shapes.

The advantages of the present invention over the prior art an be said to include the following:

The continuous making of soy curd;

The ability to achieve soy curd of a constant and desired consistency;

No mold and no cloth;

Able to clean in place, thus more hygienic and less contamination of the soy product;

Flexibility, as different size and/or consistency of soy curd blocks can be obtained;

Space saving, as less factory space is required for the apparatus;

Reduced labour costs;

Cost benefit savings.

Where in the foregoing description reference has been made to integers or components known equivalents, then such equivalents are deemed to be incorporated herein as if individually set forth.

Throughout the description of this specification the word "comprise" and variations of that word such as "comprises" and "comprising", are not intended to exclude other additives, components, integers or steps.

It is to be understood that the scope of the invention is not limited to the described embodiments and therefore that numerous variations and modifications may be made to these embodiments without departing from the scope of the invention.

The invention claimed is:

1. A soy curding apparatus for continuously producing soy curd from soy milk, the apparatus comprising:
    a pump for continuously pumping soy milk and formed soy curd;
    a coagulator dispensing means for adding a coagulant to the soy milk to form a soymilk coagulant mixture;
    an expansion chamber means to allow the soymilk coagulant mixture pumped thereto to mix further and to produce a pre-soy curd mixture, wherein the expansion chamber slows down the soymilk coagulant mixture to effect a drop in pressure to increase particulate size of the curd;
    a maturing means adapted to receive the pre-soy curd mixture and to allow further mixing and maturing of the pre soy curd mixture, wherein the pre-soy curd mixture matures to form soy curd of a desired consistency and particular size;
    a whey separating means positioned downstream of the maturing means for separating any whey from the soy curd formed in the maturing means;
    a tower adapted to receive the soy curd separated from the whey by the whey separating means, said tower further adapted to remove any residual whey from the soy curd to form a plug of soy curd in the tower of a desired consistency and moisture content, wherein the tower is further adapted to cut the soy curd plug to form a block of soy curd at a downstream end of the tower; and
    a conveyor adapted to receive and transport the block of soy curd from the tower.

2. A soy curding apparatus as claimed in claim 1, wherein the pump is a positive displacement pump adapted to provide constant flow of soymilk and formed soy curd.

3. A soy curding apparatus as claimed in claim 1, wherein the coagulator dispensing means is adapted to add the coagulant at a constant flow rate to enable the desired consistency of soy curd to be produced.

4. A soy curding apparatus as claimed in claim 1, wherein the maturing means is a tube of predetermined length and configuration, wherein the length and configuration of the tube is adapted to enhance further mixing and maturing of the pre soy curd mixture and to prevent the pre soy curd mixture from sticking to the internal walls of the tube.

5. A soy curding apparatus as claimed in claim 1, wherein the maturing means is a tube having one of a helical, serpentine, s-type, and sinusoidal configuration adapted to enable the soy curd to travel in a convoluted or meandering path through the tube to enhance further mixing and maturing of the pre soy curd mixture and to prevent the pre soy curd mixture from sticking to the internal walls of the tube.

6. A soy curding apparatus as claimed in claim 1, wherein the whey separating means has a chamber enclosing a perforated tube and a drain for removing whey, wherein the perforated tube is adapted to express whey through the perforations of the perforated tube into the chamber and out through the drain as the soy curd moves through the perforated tube.

7. A soy curding apparatus as claimed in claim 6, wherein the whey separating means further comprises a cutter means positioned at an upstream end of the perforated tube, wherein the cutter means is adapted to cut the soy curd as the soy curd enters the perforated tube from the maturing means to assist in the separating of whey.

8. A soy curding apparatus as claimed in claim 1, wherein the tower includes:
    a perforated column adapted to receive soy curd from the whey separating means and adapted express residual whey through the perforations of the perforated column;
    a residual whey collector adapted to collect and drain residual whey; and
    closure means positioned at the downstream end of the tower adapted to open and close at predetermined intervals, wherein in the open position a soy curd is able to exit the tower.

9. A soy curding apparatus as claimed in claim 1, wherein the tower comprises a perforated column adapted to allow the soy curd to be compressed under its own weight, due at least in part to gravitational forces, to enable residual whey to be expressed through the perforations in the perforated column.

10. A soy curding apparatus as claimed in claim 1, wherein the soy curd exits the tower through a closure means when in an open position.

11. A soy curding apparatus as claimed in claim 10, wherein the closure means includes a cutting blade adapted to cut the soy curd as the closure means moves from the open position to the closed position to enable a block of soy curd of predetermined height to be produced.

12. A soy curding apparatus as claimed in claim 1, wherein the conveyor is adapted to transport a soy block in a horizontal direction away from the tower and wherein the conveyor is adapted to move vertically towards and away from the closure means to assist in removing and forming soy curd block of a predetermined size as the soy curd exits the tower.

13. A soy curding apparatus as claimed in claim 1, wherein the conveyor is adapted to be positioned in a uppermost position, as a closure means opens, immediately below the exit of the tower such that the soy curd exiting the tower falls on to the conveyor and the conveyor is also adapted to be positioned in a lowermost position as the closure means closes, wherein the distance between the uppermost and lowermost positions can be varied to allow for a soy curd blocks of different sizes to be formed.

14. A soy curding apparatus as claimed in claim 1, wherein the conveyor means has cutter means positioned downstream from the tower adapted to cut the soy curd blocks into smaller blocks and/or shapes.

15. A method of producing soy curd from soy, the method comprising the steps of:
    (a) introducing soy milk into a soy curding apparatus;
    (b) continuously pumping soy milk and formed soy curd through the soy curding apparatus; and
    (c) adding a coagulant to the soy milk to form a soy milk and coagulant mixture;
    wherein the continuous pumping pumps the soy milk coagulant mixture into an expansion chamber of the apparatus which slows down the soymilk coagulant mixture to effect a drop in pressure thereby forming a pre-soy curd mixture of increased particulate size; the pre-soy curd mixture is pumped from the expansion chamber and matures and forms soy curd of a desired consistency and particular size; whey is separated from the soy curd; the soy curd is compressed removing residual whey to form a plug of soy curd of a desired consistency; and the plug of soy curd exits the apparatus.

* * * * *